Feb. 7, 1961 W. L. MITCHELL 2,970,618
GUIDE MEANS FOR HAND ROUTERS
Original Filed Dec. 8, 1952 2 Sheets-Sheet 1
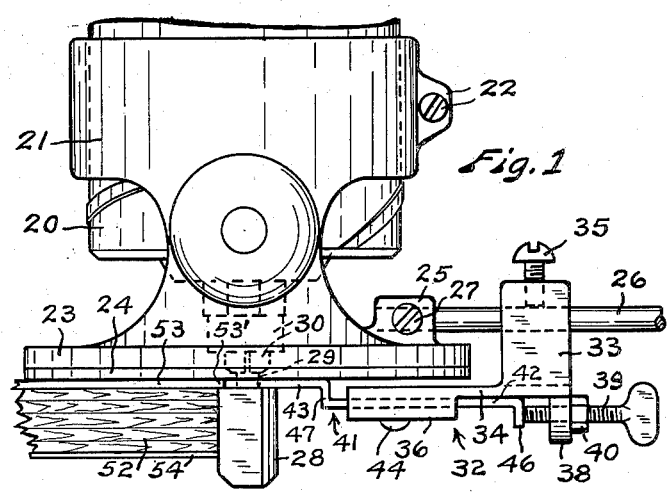
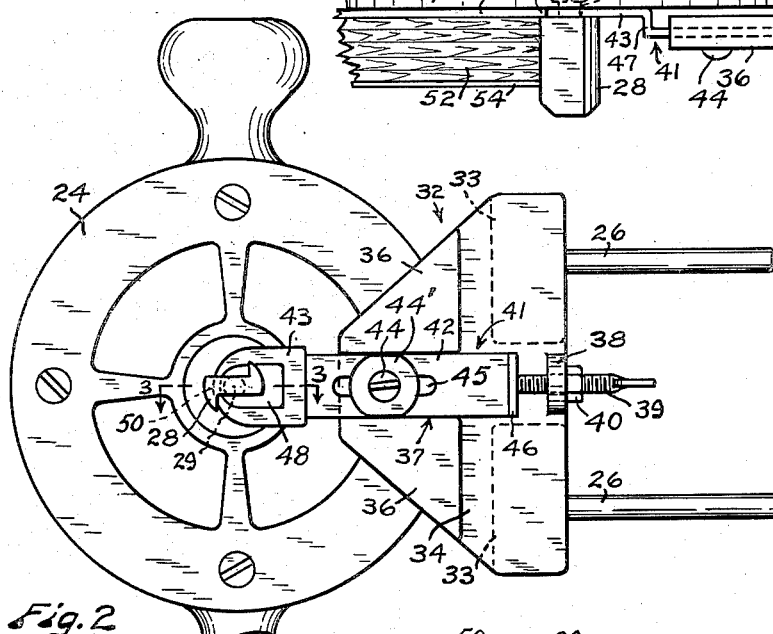
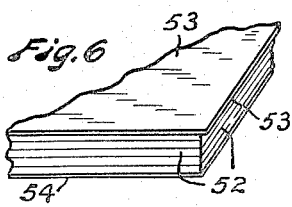
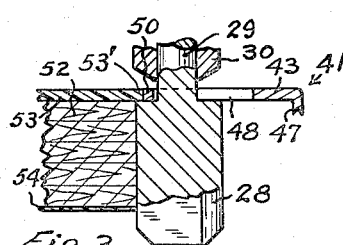
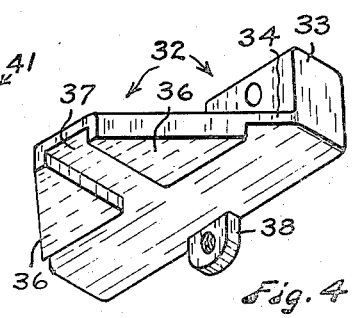
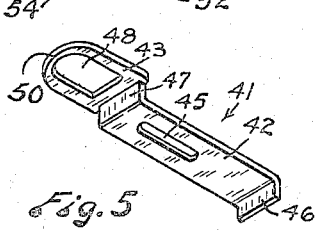
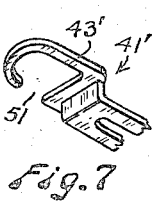
INVENTOR.
William L. Mitchell
BY
G. Wright Arnold
ATTORNEY

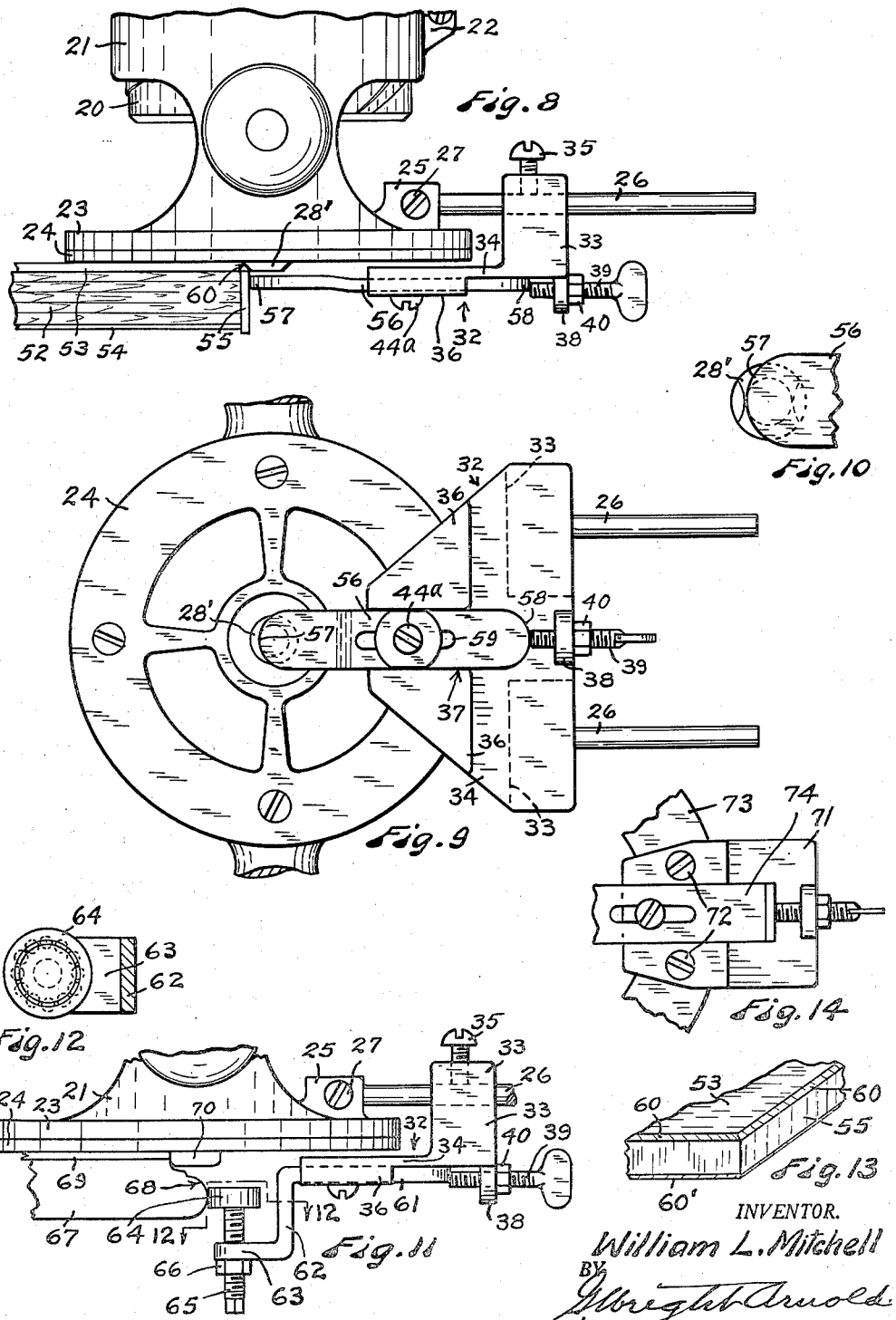

United States Patent Office 2,970,618
Patented Feb. 7, 1961

2,970,618

GUIDE MEANS FOR HAND ROUTERS

William L. Mitchell, Lafayette, La.

Continuation of application Ser. No. 324,783, Dec. 8, 1952. This application Dec. 31, 1956, Ser. No. 631,810

6 Claims. (Cl. 144—136)

This invention relates to a router template guide means. More particularly, it relates to improved template guide means adapted to be secured to an electric hand router for guiding the router bit in undercutting, edging, bevelling and similar operations, the attachment being particularly useful in undercutting, bevelling and dressing selvage edges of plastic laminates after they have been bonded on plywood stock.

An object of the invention is to provide improved template guide means for use on routers, the guide means being adjustable to provide a desired depth of cut for the router bit, and being usable for undercutting, bevelling and similar edging operations and being easy to install.

Another object of the invention is to provide template guide means for a router comprising a template contactor support carried by a router and adjustable radially of the router bit and a template contactor rigid or integral with said support and having a convexly curved template engaging portion positioned to engage with a template in a radial line along which the contactor support is adjustable.

Another object is to provide template guide means for a router comprising a template contactor which extends at least partially around the shank of the router bit.

Another object is to provide template guide means for a router comprising a template contactor which extends toward the router bit and is positioned adjacent the bit but outwardly in desired spaced relation from the outer end of the bit.

This invention is herein shown and described as applied to an electric hand router but it will be understood that the same may be applied to other routers including hand portable routers which are fixedly mounted.

The above mentioned general objects of my invention, together with others inherent in the same, are attained by the mechanism illustrated in the accompanying drawings, the same being preferred exemplary forms of embodiment of my invention, throughout which drawings like reference numerals indicate like parts.

Figure 1 is a side elevational view of an electric hand router having template guide means constructed in accordance with this invention, the guide means being set up for an undercutting operation along the edge of a plastic laminate board.

Fig. 2 is a bottom plan view of the devices shown in Fig. 1, the board being omitted.

Fig. 3 is a fragmentary view partly in section and partly in elevation, taken substantially on broken line 3—3 of Fig. 2, and on a larger scale than Fig. 2, showing a template guide member and a router bit applied to an edge portion a plastic laminate board.

Fig. 4 is a detached perspective view of a carriage member embodied in the invention.

Fig. 5 is a detached perspective view of template guide or abutment member which is supported by the carriage shown in Fig. 4.

Fig. 6 is a fragmentary perspective view of a corner portion on an undercut plastic laminate board, an edge of which has been formed by the use of the device shown in Figs. 1 and 2.

Fig. 7 is a detached fragmentary perspective view of a template guide or abutment member of modified form.

Fig. 8 is a side elevational view of an electric hand router provided with another form of template guide means constructed in accordance with this invention, showing the same applied to a plastic laminate board to perform a bevelling operation on the board.

Fig. 9 is a bottom plan view of the devices shown in Fig. 8, the board being omitted.

Fig. 10 is a fragmentary bottom plan view of the template guide means shown in Fig. 9, showing the same in relation to a bit and on a larger scale than Fig. 9.

Fig. 11 is a side elevational view of an electric hand router with still another form of template guide or abutment means constructed in accordance with this invention, showing the same set up to perform a finishing operation on the edge of a sheet of decorative plastic which is bonded to the top of a piece of furniture.

Fig. 12 is a view partly in plan and partly in section taken substantially or broken line 12—12 of Fig. 11 and showing a ball bearing type of template contacting guide.

Fig. 13 is a fragmentary perspective view of the corner of a plastic laminate board with edges bevelled, as by the use of template guide devices of the form shown in Figs. 8 and 9.

Fig. 14 is a fragmentary bottom plan view showing adjustable means of modified form for supporting a template contactor member.

Figs. 1 and 2 show a conventional electrically driven hand router comprising a motor 26 longitudinally adjustably disposed within a base housing 21 and adapted to be held immovable in the base housing 21 by clamp means 22. The base housing 21 has a base plate 23 to which is detachably secured a sub-base plate 24. The base housing 21 also has, preferably two, perforated bosses 25 which receive two outwardly projecting spaced apart parallel guide rods 26. Screws 27 rigidly secure the guide rods 26 to the bosses 25. A router bit comprising a cutting portion 28 and a shank 29 of smaller diameter than said cutting portion 28 is operatively connected with the router, preferably by securing the shank 29 within a suitable chuck or collet 30 on the shaft of the motor 20.

When the router is in use the sub-base plate 24 is ordinarily held in flat contact with the work to which the router is applied. The distance of projection of the bit 28—29 beyond the plane of the work engaging face of the sub-base plate 24 is adjusted by relatively longitudinally adjusting the motor 20 and base housing 21. This provides for properly positioning a bit for cutting purposes.

The hand router parts just hereinbefore described are of conventional construction.

The hereinafter described parts, made in accordance with the invention, comprise a carriage or guide mounting block 32 adjustably mounted on the guide rods 26. This carriage 32 comprises two spaced apart perforated bearing lugs 33 integral with a plate member 34. The guide rods 26 extend through the lugs 33 and screws 35 threaded into lugs 33 fixedly secure the carriage 32 in any desired adjusted position on the guide rods 26.

The carriage plate 34 is offset relative to the sub-base plate 24 and normally underlaps the same. Preferably the carriage plate 34 is convergently tapered toward its inner end to minimize obstruction of the sub-base plate 24 as respects work to which the router is applied. The side of the carriage remote from the sub-base plate 24 has two spaced apart bosses 36 which cooperate to form a track or guideway 37 of uniform width extending radially of the router. A lug 38 is longitudinally aligned with the guideway 37 and an abutment screw 39 is threaded through the lug 38 and provided with a lock nut 40.

A template guide or abutment member 41 is disposed within the guideway 37 and supported by the carriage 32. This template guide or abutment member 41 comprises a supporting portion, herein termed a template contactor support 42 and a template engaging portion herein termed a template contactor 43. The template contactor 43 is preferably connected by an integral offset portion 47 with the template contactor support 42 and is positioned in operative relation to the bit 28, 29. A screw 44 operating in a longitudinal slot 45 in the template contactor support 42 clamps said support to the carriage plate 34. Preferably a washer 44' is used between the head of screw 44 and contactor support 42. The outer end of the template contactor support has a downwardly offset portion 46 which is engaged by the abutment screw 39. The abutment screw 39 thus provides for accurate adjustment of the template guide member 41 and cooperates in rigidly supporting the same.

The template contactor 43 is relatively thin and flat and has an aperture 48 therein which loosely fits over the shank 29 of the bit. The aperture 48 may be large enough to be passed over the cutting portion 28 of the bit, although this is not essential, and said aperture is large enough to provide for longitudinal adjustment of the template guide 41. The template engaging end portion 50 of the part 43 is of narrow width and is convexly rounded on an arc somewhat greater than the arc on which the bit 28 cuts. As shown in Figs. 1, 2 and 3 the offset between the shank 29 and the cutting circle of the bit 28 is substantially greater than the width of the template engaging portion 50 of the part 43 so that the portion 50 may be set inwardly a substantial distance relative to the cutting circle of the bit part 28. Also this template engaging portion 50 is positioned on the opposite side of the axis of the bit from the template contactor support 42 and substantially in a plane radial to the axis of the bit and perpendicular to the edge of the work to which the bit is applied and extending longitudinally of the template contactor support.

The template guide member 41' shown in Fig. 7 is similar to the template guide member 41 shown in Figs. 1, 2, 3 and 5 except that one side of the template contactor part 43' thereof is cut away to provide a side opening 51 which may be passed over the bit shank 29. This template contactor part 43' extends partially around the bit shank 29 and functions in the same manner as the template contactor part 43.

With the template abutment member or guide 41 in the adjusted position shown in Figs. 1, 2 and 3 the router may be employed to undercut the edge of a board composed of a plywood core 52 having a top sheet 53 of durable decorative plastic material and bottom sheet 54, also of plastic material, bonded thereto. In making the cut the router sub-base 24 is placed on the top surface of the board and the router bit is applied to the edge of the board as shown in Figs. 1 and 3. Thus the edge of the top sheet 53 of plastic material serves as a template and is engaged by the part 50 of the template contactor 43. As the router is moved along the edge of the board the blade part 28 undercuts the plywood 52 and bottom sheet 54 and leaves an overhanging edge portion 53' of the decorative plastic top sheet 53. Obviously the undercut may be made around as much of the edge portion of the board as desired. The undercutting as just previously described, is an initial step preparatory to bonding a strip 55 of decorative plastic edging, Fig. 8, to the edge of a board. The surface coat of this plastic edging is thin and is easily destroyed if a driven tool is allowed to come into contact with the same. Figs. 8 and 9 illustrate template guide means used in bevelling the edges of any board or like piece of material and particularly of a board to which the plastic edging 55 has been bonded. In Figs. 8 and 9 the parts 20 to 27 inclusive and 32 to 40 inclusive are the same as the correspondingly numbered parts in Figs. 1, 2 and 4 and the description pertaining to Figs. 1, 2 and 4 applies equally well to Figs. 8 and 9.

The template guide or abutment member shown in Figs. 8 and 9 comprises a medial contactor support portion 56 having two rounded integral template contactor portions 57 and 58 on opposite ends thereof. A screw 44a operating through a slot 59 secures the template guide part 56 to the carriage 32. One template contactor portion 57 is slightly offset relative to the contactor support portion 56. This template guide shown in Figs. 8 and 9 is reversible side for side, when used with the offset contactor member 57 toward the work and is also reversible end for end when positioned so that the contactor member 57 is offset away from the carriage plate 34. Reversing the positions of the template guide of Figs. 8 and 9 as above described provides variation as respects the distance of the contactor members 57 and 58 from the end of the driven bevelling tool 28' shown in Figs. 8 and 9.

The template guide shown in Figs. 8 and 9 is adjusted so that the outermost rounded end part of the template contactor, such as contactor 57, is positioned inwardly from the projected outer cutting circle of the bevelling tool 28'. The sub-base 24 of the router is placed on the board with the tip portion of the contactor 57 in line contact with the edging strip 55. The strip 55 thus serves as a template and movement of the router along the edge of the board will form a bevel 60 on the overhanging edge 53' of the sheet 53, see also Fig. 13. The contactor 57 is positioned adjacent to and outwardly from the cutting end of the bit 28' and in the instance shown extends partly across the end of the bit 28', and the rounded tip part of the contactor 57 which engages the template strip 55 is positioned substantially in a plane which coincides with the direction along which the contactor 56 is moved when it is adjusted and which is perpendicular to the plane of the strip 55 and passes through the projected axis of the bit 28'. As the template guide member illustrated in Figs. 8 and 9 operates in spaced relation below the end of the bit 28' its width is not limited by the thickness of the top sheet of plastic material and it is of greater thickness than the corresponding template guide members shown in Figs. 1 to 5 and 7. Obviously a bevel 60' may be made on the bottom edge of the strip 55 shown in Figs. 8 and 13 in a manner similar to the bevelling of the top edge.

Referring to Figs. 11 and 12 the parts 21 to 27 inclusive and 32 to 40 inclusive shown in Fig. 11 are similar to the correspondingly numbered parts shown in Figs. 1, 2 and 4, and where shown, are similarly numbered and the description pertaining to Figs. 1, 2 and 4 applies also to Fig. 11. The template guide shown in Fig. 11 comprises a template contactor support part 61, an integral downwardly offset part 62 on the inner end of part 61, an integral terminal portion 63 extending approximately at right angles from the downwardly offset portion 62 and a template contacting anti-friction roller bearing 64 carried by the part 63. The roller bearing 64 is adjustably supported by a screw 65 which is threaded through the part 63 and has a lock nut 66 thereon. The template guide means shown in Fig. 11 is used in a manner similar to that illustrated in Fig. 8 with the template contacting means 64 engaging the edge of the work outwardly from the cutting end of the bit. For instance, in reconditioning a piece of furniture having a top 67 and an ornamental edge part 68 a sheet of decorative plastic 69 may be bonded to the top 67 with the edge thereof overhanging. Then the router may be used to trim away this overhanging edge part with the rounded edge 68 of the top member serving as a template and the roller bearing 64 held firmly against this rounded edge 68 as the router is moved along the edge of the top member 69 with a router bit 70 trimming the overhanging edge of the decorative plastic sheet 69.

In the modified form of this invention shown in Fig. 14 the carriage or guide mounting block 32 and guide rods 26 shown in the previous figures are dispensed with and a guide mounting block 71 is secured by screws 72 to a sub-base plate 73 of a router. The sub-base plate 73 is similar to the previously described sub-base plate 24. The mounting block 71 is similar to the carriage 32 except that it is narrower. A template guide member 74, similar to the template guide member 41, is adjustably secured to the mounting block 74 in the same manner in which template guide member 41 is secured to carriage 32 and functions in the same manner. The adjustment afforded by the template guide member 74 is sufficient for most kinds of work. It will be understood that template guide members of various different shapes, such for instance as the template guide member 56 of Figs. 8 and 9 and the template guide member 61 of Fig. 11, may be used in the mounting block 71 shown in Fig. 14.

The template engaging end portions of the template guide members 41, 56 and 61 are convexly curved on arcs which are only slightly greater than the cutting arcs of the bit and these guide members each have a line of contact rather than a flat area of contact with the respective edges or surfaces which are used as templates. This line of contact is in a plane which passes through the axis of the tool and is substantially perpendicular to the edge of the material along which the tool is being moved. For this reason small variations in the angular position of the router on the work, such as are liable to occur in the operation of a hand tool, will not result in disalignment of the tool and imperfections in the work. Obviously if the template guide means contacts the member which serves as a template ahead of the tool or to the rear of the tool or both ahead and to the rear of the tool then angular deviation of the router away from the correct position will deviate the router tool away from ist proper line along the edge of the work and this will result in imperfections in the work. Also accurate operation of the tool around curves is facilitated by having line contact of the template guide in a plane which is perpendicular to the template edge and passes through the axis of the tool.

Obviously changes may be made in the forms, dimensions and arrangement of parts of my invention, without departing from the principle thereof, the above setting forth only preferred forms of embodiment.

This application is a continuation of my co-pending application Serial No. 324,783, filed December 8, 1952, entitled, "Template Guide Means for Routers," now abandoned.

I claim:

1. In combination with a router having a work engaging base portion and a rotatively driven bit extending below said base portion, template guide means comprising rigid guide rods extending outwardly from said base portion, a carriage movable mounted on said guide rods for adjustment toward and away from said router bit, guide means provided on said carriage, a template contactor support mounted by said guide means for radial adjustment relative to said bit, and a template contactor rigid with said support having a template engaging portion convexly curved on a radius greater than the cutting radius of said bit, said template contactor contacting the template along a vertical line adjacent said bit and substantially perpendicular to the radial line of adjustment of said template contactor support.

2. In combination with an electric hand router having a rotary bit projecting from its bottom end; outwardly extending guide rods secured to said router; a carriage adjustably secured to said guide rods; guide means on said carriage extending toward said bit; a template abutment member slidably supported by said guide means and extending adjacent said bit; clamping means secured to said carriage and clampingly engaging the intermediate portion of said template abutment member; and an abutment screw threadedly engaged with said carriage substantially in longitudinal alignment with and engaging the outer end of said template abutment member.

3. In combination with a conventional electric hand router having a motor router bit, a work engaging base surrounding said bit, said base uniformly supporting in balanced relation said motor for driving said bit, the vertical axis of said motor and said bit forming a vertical axis for the base and the router as a whole and providing thereby for precision operation of the tool, an attachment comprising, a guide member mounting block beneath said base disposed adjacent to and radially of said bit to permit maintaining said balance and removably fixable to said underside of said base; a longitudinally disposed guideway in said block extending parallel to said base; a guide member having a template contactor supporting portion and a template contactor portion in different planes, said guide member selectively mountable in said guide way, said template contactor portion having an end of convexly curved arc of greater radius than the radius of the cutting arc of the bit, said template contactor end extending normally to a single line of engagement with the work adjacent to said bit in providing for maximum cut of the bit to a predetermined line of cut.

4. In combination with a conventional electric hand router having a motor router bit, a work engaging base surrounding said bit, said base uniformly supporting in balanced relation said motor for driving said bit, the vertical axis of said motor and said bit forming a vertical axis for the base and the router as a whole, an attachment comprising a guide member mounting block disposed radially of said bit and removably fixable to the underside of said base; a longitudinally disposed guideway in said block extending parallel to said base; a guide member having a template contactor supporting portion and a template contactor portion, said template contactor portion having an end of convexly curved arc of greater radius than the radius of the cutting arc of the bit, said contactor end extending normally to a single line of engagement with the work adjacent to said bit in providing for maximum cut of the bit to a predetermined line of cut.

5. In combination with a conventional electric hand router having a motor driven router bit which has a shank and a work engaging base the vertical axis of which is the vertical axis of said motor and bit thereby providing a balance about said axis, an attachment comprising a guide member mounting block beneath said base disposed adjacent to and radially of said bit to permit maintaining said balance and removably fixable to said underside of said base; a work engaging guide member radially slidably mounted on said block having a template contactor supporting portion and a template contactor portion to bear against a template, said template contactor portion having an end of a convexly curved arc form, which guide member has sides flaring backwardly and the radius of the arc of the guide member is greater than the radius of the cutting arc of the bit, said template contactor portion extending to a single tangent line of engagement with the work adjacent to said bit when the center of said arc has its radius and the center of said bit has its radius located in the same radial line normal to said work, in providing the maximum cut for said bit to a predetermined line of cut, the balance of the device about its vertical axis contributing to the precision and ease of application of the device.

6. In combination with a conventional electric hand router having a motor router bit, a work engaging base surrounding said bit, said base uniformly supporting in balanced relation said motor for driving said bit, the vertical axis of said motor and said bit forming a vertical axis for the base and the router as a whole, an attachment comprising a guide member mounting block disposed radially of said bit and removably fixable to said base; a longitudinally disposed guideway in said block extending parallel to said base; a guide member having a template contactor supporting portion and a template contactor portion, said guide member having different shapes selectively mountable in said guide way, said template contactor portion having an end of convexly curved arc having greater radius than the radius of the cutting arc of the bit, said template contactor end extending to a single line of engagement with the work adjacent to said bit in providing for maximum cut of the bit to a predetermined line of cut; and adjustment means operatively engageable with said guide member for selectively positioning the work-engaging end portion of said guide member at a desired position relative the work.

References Cited in the file of this patent

UNITED STATES PATENTS

| | | |
|---|---|---|
| 1,115,995 | Willson | Nov. 3, 1914 |
| 1,361,377 | Forster | Dec. 7, 1920 |
| 1,506,154 | Berthelsen et al. | Aug. 26, 1924 |
| 1,615,213 | Carter | Jan. 25, 1927 |
| 1,715,380 | Onsrud | June 4, 1929 |
| 1,839,196 | Cameron | Jan. 5, 1932 |
| 2,261,055 | Dulaney | Oct. 28, 1941 |
| 2,323,587 | Duffy | July 6, 1943 |
| 2,587,994 | Gregory | Mar. 4, 1952 |
| 2,599,712 | Izen | June 10, 1952 |
| 2,672,898 | Schuster | Mar. 23, 1954 |
| 2,726,690 | Schacher | Dec. 13, 1955 |

FOREIGN PATENTS

| | | |
|---|---|---|
| 809,356 | Germany | July 30, 1951 |